Nov. 27, 1945. J. H. REICHART 2,389,741
GLASS VESSEL BAND AND HANDLE STRUCTURE
Filed Aug. 11, 1943
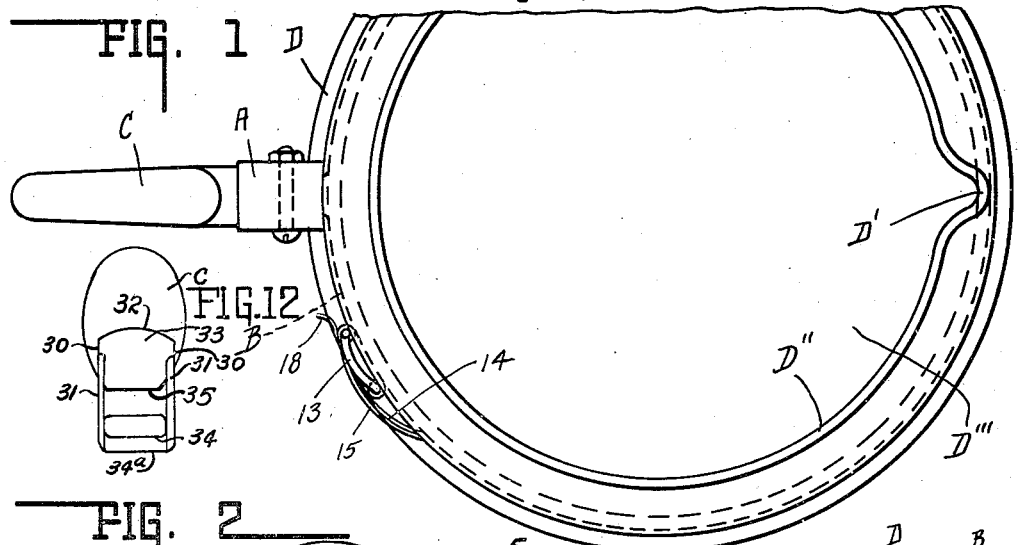
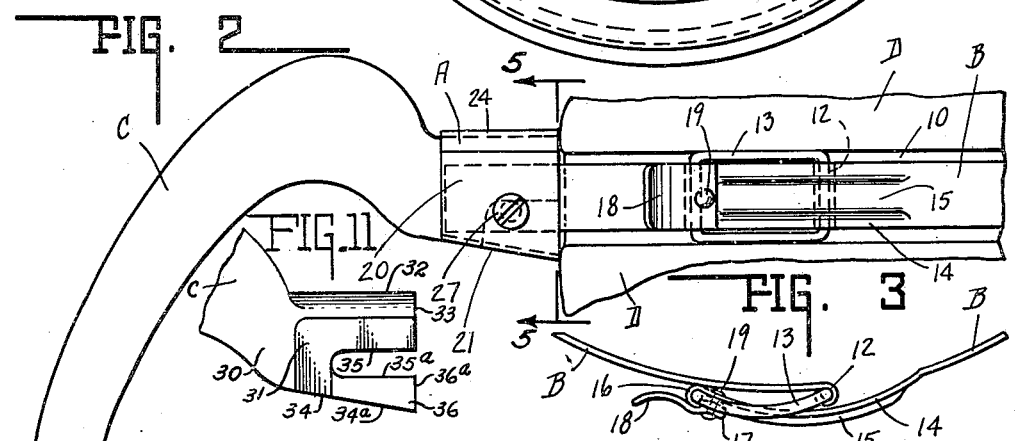
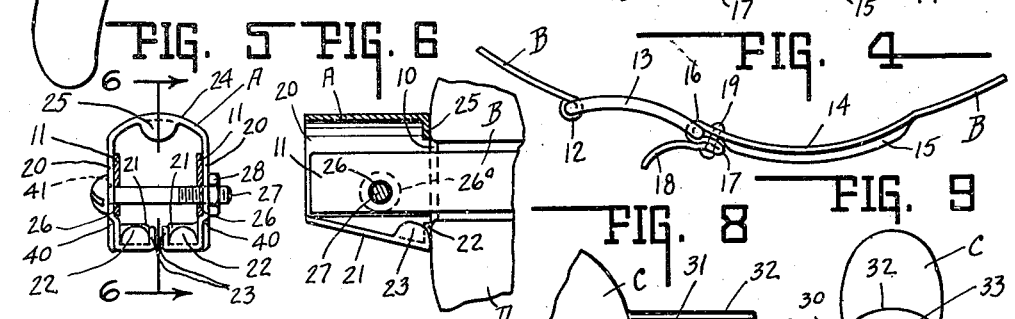
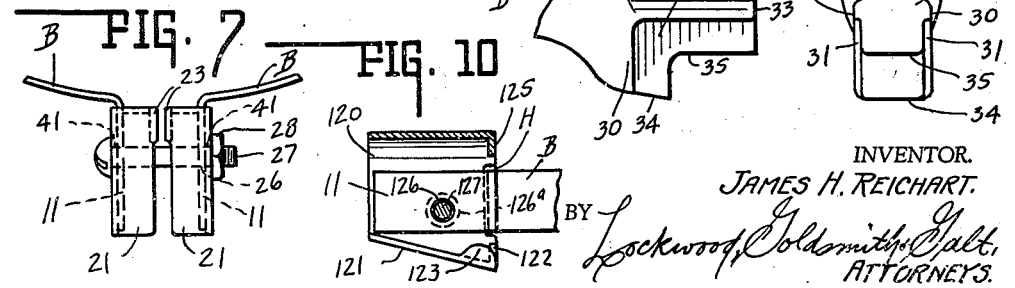
INVENTOR.
JAMES H. REICHART.
BY Lockwood, Goldsmith & Galt,
ATTORNEYS.

Patented Nov. 27, 1945

2,389,741

UNITED STATES PATENT OFFICE 2,389,741

GLASS VESSEL BAND AND HANDLE STRUCTURE

James H. Reichart, Muncie, Ind.

Application August 11, 1943, Serial No. 498,220

4 Claims. (Cl. 24—71)

This invention relates to a glass vessel handle and band structure.

The present invention is directed to a vessel enveloping and extensible and contractable endless band provided with a handle normally rigid therewith. Broadly, the advantage hereof is that the band is endless and when expanded can be readily telescoped upon the vessel and when contracted is clamped upon the vessel. Enlarging and reducing band length, accordingly, constitutes the sole operations required of the housewife to separate and unite respectively the vessel and handled band.

The chief object of the present invention is to provide a structure of the foregoing character and which in addition thereto includes many highly desirable features of construction, utilization and use, all of which will be set forth more fully hereinafter.

These features specifically reside in the band, the band extensible and contractible portion, the handle and clip connection, the band and clip connection, the handle and band association, etc., as will more fully appear herein.

Other objects and features also will be set forth more in detail hereinafter.

The full nature of the invention will be understood from the accompanying drawing and the following description and claims.

In the drawing

Fig. 1 is a top plan view of a glass vessel such as the bottom member of a double boiler structure and with the anchoring band, handle, etc., applied thereto.

Fig. 2 is a side elevation of but a portion of the vessel and band, the clip and handle being associated therewith, the band parts being in collapsed or contracted position.

Fig. 4 is a top plan (in effect an edge) view of the contractible or collapsible and extensible or expansible portion of the endless band and in the extended or open position. Fig. 3 is the same collapsed.

Fig. 5 is a vertical section, to show the handle-band end connecting clip, the handle being omitted, the section being taken on line 5—5 of Fig. 2 and in the direction of the arrows.

Fig. 6 is a central sectional view taken on line 6—6 of Fig. 5 and in the direction of the arrows.

Fig. 7 is a bottom plan view of the same parts.

Fig. 8 is a side elevation of the clip anchored, band end nesting portion of the handle.

Fig. 9 is an end view thereof.

Fig. 10 illustrates a modified (slotted or notched) form of clip and is similar to Fig. 6.

Fig. 11 is a side elevation of the anchored, band end nesting portion of a handle similar to that illustrated in Fig. 8.

Fig. 12 is an end view of the handle shown in Fig. 11.

In Figs. 1 and 2 of the drawing, A indicates broadly the clip, B the endless band, C the handle and D the vessel. The vessel is of glass and lipped as at D' and having a mouth D" of less than the major diameter. Midway between the mouth and vessel bottom D''' is an external peripheral groove, see Fig. 2, which is of endless band nesting or seating character. This groove forms a shoulder-like projection above and below the band engageable portion. This construction stiffens the utensil, giving it a channel-like construction substantially at the middle of the vessel where greatest strength is required to prevent collapse when used for double boiler purposes. This construction, accordingly, provides a predetermined recessed seat for the band and of lesser diameter than the adjacent projecting portions of the vessel.

The so-called endless band B includes two substantially parallel ends 11, see Figs. 5, 6 and 7, each at right angles to the band proper, as shown in Fig. 7. This includes a closed cylindrical portion 12, see Fig. 3, in which is pivotally anchored one leg of the rectangular buckle 13. This, as shown in Fig. 2, is elongated and arcuate in shape, see Figs. 3 and 4.

The band B adjacent thereto includes an oppositely curved portion 14, which herein is longitudinally embossed as at 15 for stiffening and strengthening purposes. A closed cylindrical portion 16 pivotally anchors to the opposite leg of buckle 13. The band end is then turned back upon itself as at 17 and terminates in a finger tip piece 18. Portions 14 and 17 are rigidly secured together by any suitable means or by welding, if desired. Herein, because of the light or thin character of the band stock, it is preferred to stake these parts together by rivet 19.

These curled anchorages for the buckle 13 permit lighter weight band metal to be employed, because the full width of the band takes the total tensile strain and same is not localized. It will be observed that portion 14 is slightly offset from its immediately contiguous portion of the band. This is for clearance or accommodation of the buckle, so that when it is reversed in position (see Figs. 2 and 3), as compared to Fig. 4, it will lie immediately outside of and against the band, and between it and the nesting offset portion 14.

When the parts are positioned as shown in Figs.

2 and 3, the band is firmly seated in the groove 10 and rigidly clamped to vessel D. When open or extended, as in Fig. 4, the endless band can readily be slipped from or applied to the vessel. This offsetting of portion 14 has the additional function of "throwing" the finger tip 18 outward from the vessel, when the band is mounted, to facilitate finger engagement. This offsetting also, in effect, results in the portions locking "over-center" as it were, as shown in Fig. 3, and the tensile strain imposed insures retention of the lock in the band clamping position until positively manually released because the result is one of cam-like action.

Since, in glass fabrication, due to mold wear, slumping in cooling, etc., supposedly identical vessels may slightly vary in diameter, this arcuate shape of both the buckle and the adjacent offset portion of the band will automatically provide for adjustment to, or accommodation for such variation, with the result that in all instances, despite ware variation, the desired anchorage can and will be obtained. Likewise if the band should be accidentally stretched or straightened, this stretch can be readily removed by reestablishing the arcuity in the buckle 13. This also is a means to readily adjust the band permanent length. To increase band length in collapsed position, see Fig. 3, the buckle has an arc of lesser radius.

The band, with its arched offset portion 14, embossed as at 15 and the buckle 13, is of a length just sufficient to embrace in collapsed position the girth of the smallest vessel. Should the vessel have a greater girth than aforesaid, bending the buckle 13, see Fig. 3, will position pivot 12 closer to pivot 16 and hence the band peripheral length is correspondingly increased by increasing the curvature of the buckle 13.

Should an oversize vessel become broken and the housewife acquires a smaller size replacement, then the original band can be adjusted to the replacement vessel by merely flattening, to the desired degree, the buckle 13. Hence adjustment is readily effected without the use of screws, etc., and detachment of parts, in other words, the band as fabricated can be expeditiously adjusted to the peripheral length by pressure only applied to the buckle.

The comparative yielding property of buckle 13 is also utilized in the automatic adjustment of the band in the initial mounting thereof upon a vessel by the band pulling at 12 toward the left in Fig. 3 and upon the buckle 13 to instantly bend it to provide the required increase in band length for collapsed band mounting upon the vessel. This buckle yield or bending property prevents glass fracture or collapse in initial band application to vessel. This is a safety factor.

The foregoing is preferred. However, within the scope of this invention it is contemplated that portion 14 may be treated so that it can be curved or bent as well as straightened out. In initial application band length increase, in this instance, is obtained by straightening to the desired length the bent portion 14. This is automatic.

Note in Figs. 1 and 2, the clip A abuts the vessel D at the projections defining the groove 10. When the vessel is smooth faced, that is without a peripheral groove therein, the clip, accordingly, must be provided with clearance for the band in order that the clip end bears rigidly against the vessel and the band rigidly clamp thereon. A modified form of clip and band end connection is illustrated in Fig. 10, and numerals of the one hundred series, similar to primary numerals employed in Figs. 5, 6 and 7, indicate like or similar parts, except that the letter H indicates the band clearance accommodation notch in each side of the clip. Hence, in both forms of the invention the metal clip A bears against the vessel above and below the band clampingly encompassing same. The band adjacent the clip when so engaged tends to effect a dual and oppositely directed guy wire effect tending to rigidize or draw the clip toward and in contact with the vessel.

Reference will now be had to the clip A illustrated in Figs. 5 to 7, inclusive, in detail and to which reference has been had hereinbefore relative to the modified form illustrated in Fig. 10.

In the said three figures the clip is illustrated as formed from a single blank. It includes two side portions 20, each of which has a downwardly and vessel directed lower edge defined by an inwardly directed flange 21. Near the lower and glass vessel engaging end are tongues 22. The adjacent edges of flanges 21, near the lower ends, are also provided with tongues 23 for abutting engagement. The two sides at their upper ends are connected by an arched portion 24 which at its forward or vessel engaging end is provided with one or more depending tongues 25. Each sidewall is apertured at 26 and the portion contiguous thereto is embossed as at 26a, if desired. These apertures register and receive a transverse connector or retainer herein shown as a bolt 27 and nut 28. If desired, other types of connectors may be employed.

The glass or other suitable material handle (wood-plastic-phenol condensation product, etc.), and indicated by C in Figs. 1 and 2, may be straight, curved, arched, etc., as desired. In other words, it may be of pistol grip or stem type, whichever is most convenient. Whatever may be its selected form for the hand engageable portion, the clip anchored portion includes two parallel sides 30, each with a recess 31 therein to nest the adjacent angular end 11 of the strap or band B. The upper face is arched as shown at 32 and the forward face 33, when clip seated, engages tongue or tongues 25.

Glass to glass contact causes abrasion. Now this on the handle is not serious. This on the vessel, however, is critical for such abrasion weakens the surface of the vessel which is stable only within certain critical limits in ware of the character specified. Accordingly, tongue 25, and in the modified form, see Figs. 11 and 12, to be described, tongues 22 prevent handle-vessel contact and, accordingly, prevent vessel surface abrasion, thus eliminating vessel breakage and shattering, at least from this contact cause. These tongues by contacting the vessel also prevent what would be the glass confronting edges of the clip from engaging and scratching the vessel. In other words, the contact is of facial surface type and therefore non-abrasive relative to the vessel, instead of edge contact type.

Again referring to Figs. 8 and 9, the clip engageable portion of the handle includes a downwardly and vessel directed lower face 34 that conforms to the slope of flanges 21 of the clip. While a hole may be extended through the clip engaged portion of the handle C for bolt or connector passage, the preferred accommodation is by the slot or cutout 35 shown by full lines in Figs. 7 and 8. In Figs. 11 and 12 there is illustrated a similar handle having a longitudinal slot 35a, a lower spaced portion 36 adapted at its free end 36a to engage clip tongues 22, and a lower face 34a, a continuation of inclined face 34.

Each side 20 of the clip has its lower and flange supporting portion offset inwardly as at 40, see Fig. 5. This forms ledges upon which the lower faces of band ends 11 bear when clip mounted, said ends being seated in recesses 31 of the clip engaged portion of the handle C. Each end 11 is provided with an anchorage passing aperture 41 positioned to register with the clip apertures 26 and handle notch or slot 35 when all are connected together by the connecting means (herein bolt 27 and nut 28). The embossments 26a permit of connector tightening to rigidly anchor the handle, clip and band ends together. Such embossments provide ornamentation and distributes the clamping pressure of the connector to the glass body remote from the notch. The split between flanges also is an accommodation feature for that purpose.

Since the apertures 41 are only of a size to pass the connector, a loose handle structure does not result. This close fit, as it were, may require slightly more assembly time, but when the handle, clip and band ends are once assembled, it is intended that disassembly not occur unless a new band, or new handle be required since the normal use of this device only requires opening and closing the band as initially described.

In use, it is to be observed that the strain or weight of the vessel when handle supported is transmitted to the band ends 11 and by same, due to the glass recesses 31 and ledges 40 to the clip at the arch strengthened top 24 against which bears the top arched face 32 of the handle.

When the vessel is handle lifted the handle-clip pressure points are the two adjacent arched surfaces 24 and 32 and the adjacent inclined surfaces 21 and 34, so that little, if any, strain is upon the connection means, bolt 27 and nut 28, for the band ends 11 are at right angles to the band B, see Fig. 7, and are localized by recesses 31 and ledges 40. The vessel weight therefore is transferred to the handle substantially by the clip only and not by the connecting means. Hence, wear on the clip apertures and band end apertures is a minimum if it should ever occur, which is doubted. Note the band end apertures are not centered either transversely or longitudinally in the ends 11.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A handled band structure for mounting upon a vessel to be enveloped thereby and for detaching therefrom including in combination a handled, strap-type band of a normally non-extensible material and of a length greater than the vessel periphery to be clampingly engaged by the band and parted to form ends capable of overlapping when vessel mounted, each end terminating in a substantially closed curl portion of a length equal to the width of the band, one end of the band having an outwardly directed arched formation, an outwardly directed finger engageable portion, and an arch shaped rectangular loop type buckle having parallel side portions secured by and pivoting in the band end curled portions and of a length greater than the latter and the band, the other two portions of the arched loop buckle being curved oppositely with respect to the band end arched portion, the latter, when the band is collapsed, extending through the buckle between said curved portions thereof, the loop buckle having tensioning capabilities and being capable of forcible curvature deformation for tension variation, the arching of the band end and nesting of same between the arched portions of the buckle providing that the curled end immediately contiguous to the vessel, when the band is collapsed thereon, is in circular registration with and immediately adjacent the other end of the band at the initial arching thereof for substantially complete circular engagement of the vessel when the band is clampingly mounted thereon.

2. A handled band structure as defined by claim 1 wherein the finger piece portion comprises an integral extension of the arched band portion.

3. A handled band structure as defined by claim 1 wherein the finger piece portion comprises an integral extension of the arched band portion, and laps the buckle loop when the band is extended and is curved in the same general direction as the buckle loop.

4. A handled band structure as defined by claim 1 wherein the arch shaped band end includes a longitudinally directed embossment for arch stiffening purposes.

JAMES H. REICHART.